United States Patent
Ryan, Jr. et al.

[11] Patent Number: 5,871,288
[45] Date of Patent: Feb. 16, 1999

[54] METHOD FOR CUSTOMER SELECTABLE MODULE SIZE FOR AN INFORMATION BASED INDICIA

[75] Inventors: Frederick W. Ryan, Jr., Oxford; Robert W. Sisson, Shelton, both of Conn.

[73] Assignee: Pitney Bowes Inc., Stamford, Conn.

[21] Appl. No.: 771,992

[22] Filed: Dec. 24, 1996

[51] Int. Cl.[6] .................................................. B41J 05/30
[52] U.S. Cl. .......................................... 400/103; 400/74
[58] Field of Search ............................ 400/74, 103, 104, 400/120.13, 88; 347/187, 193, 16

[56] References Cited

U.S. PATENT DOCUMENTS

| | | | |
|---|---|---|---|
| 4,641,347 | 2/1987 | Clark | 400/104 |
| 4,661,001 | 4/1987 | Takai | 400/103 |
| 4,661,824 | 4/1987 | Kuge | 347/193 |
| 4,746,931 | 5/1988 | Okuda | 347/193 |
| 4,795,281 | 1/1989 | Ulinski | 400/74 |
| 4,795,999 | 1/1989 | Takahashi et al. | 347/193 |
| 4,864,112 | 9/1989 | Imai et al. | 400/104 |
| 4,960,336 | 10/1990 | Brooks | 400/103 |
| 5,056,429 | 10/1991 | Hirosaki | 400/103 |
| 5,061,946 | 10/1991 | Helmbold | 400/708 |
| 5,183,343 | 2/1993 | Tazawa et al. | 400/103 |
| 5,188,464 | 2/1993 | Aaron | 400/103 |
| 5,259,678 | 11/1993 | Uchida | 400/103 |
| 5,263,994 | 11/1993 | Ueda | 400/708 |
| 5,428,211 | 6/1995 | Zheng | 235/462 |
| 5,475,399 | 12/1995 | Borsuk | 345/130 |
| 5,521,674 | 5/1996 | Guillory et al. | 347/16 |
| 5,564,841 | 10/1996 | Austin et al. | 400/74 |
| 5,676,473 | 10/1997 | Wright | 400/103 |

*Primary Examiner*—John Hilten
*Assistant Examiner*—Steven S. Kelley
*Attorney, Agent, or Firm*—Charles R. Malandra, Jr.; Melvin J. Scolnick

[57] ABSTRACT

A method is provided for improving print quality for a 2-D bar code. The method includes determining printer type, including print resolution, for printer that will print 2-D bar code and entering paper type for the envelope. A suggested 2-D bar code module size is calculated based on the paper and the printer type. A test sample 2-D bar code is printed at the suggested 2-D bar code module size. The printed test sample is scanned and then evaluated for print quality and readability. The method can also suggest a 2-D bar code module size to the user.

13 Claims, 3 Drawing Sheets

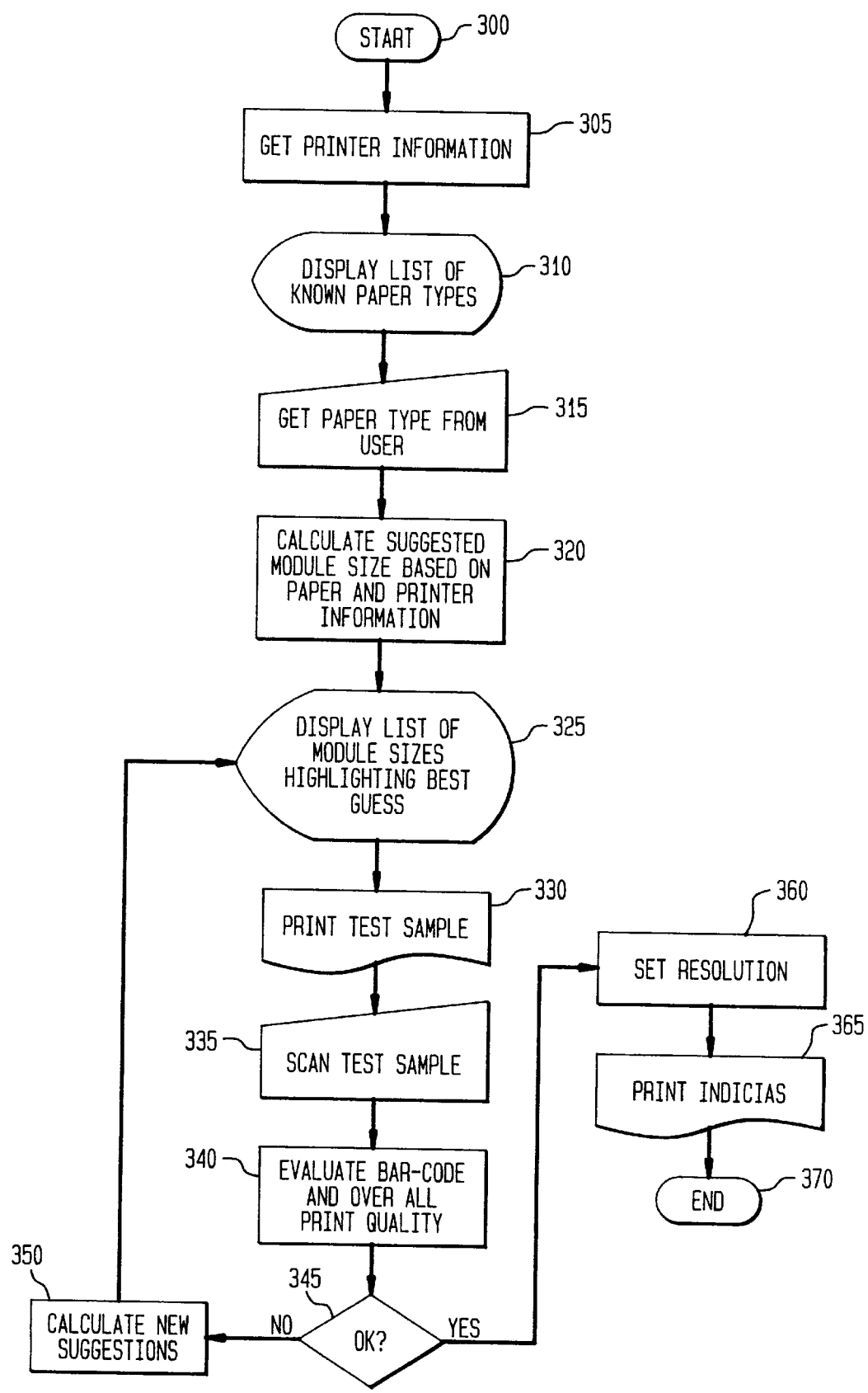

METHOD FOR CUSTOMER SELECTABLE MODULE SIZE FOR AN INFORMATION BASED INDICIA

FIELD OF THE INVENTION

The present invention relates generally to systems and methods for generating and printing digital indicia and, more particularly, to such systems and methods for generating and printing information based indicia in postage metering system.

BACKGROUND OF THE INVENTION

The Information-Based Indicia Program (IBIP) is a distributed trusted system proposed by the United States Postal Service (USPS). The IBIP is expected to support new methods of applying postage in addition to, and eventually in lieu of, the current approach, which typically relies on a postage meter to mechanically print indicia on mailpieces. The IBIP requires printing large, high density, two dimensional (2-D) bar codes, such as PDF417 bar codes, on mailpieces. The requirements for printing a PDF417 2-D bar code are set forth in The Uniform Symbology Specification. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

The user infrastructure, which resides at the user's site, comprises a postage security device (PSD) coupled to a host system. The PSD is a secure processor-based accounting device that dispenses and accounts for postal value stored therein. The host system (Host) may be a personal computer (PC) or a meter-based host processor.

The proposed IBIP Indicium Specification requires a minimum bar code read rate of 99.9%. The Specification places the responsibility on each IBIP vendor to meet such requirement. One of the issues raised concerning the proposed IBIP is the readability of 2-D bar codes printed on envelopes. Different printing technologies work well with different types of paper. One particularly bad combination is ink jet printing on porous paper, such as recycled paper. The ink spots tend to feather reducing the resolution and quality of the print. Thus, there is concern over of 2-D bar codes printed by ink-jet printers. Because the 2-D bar code comprises a lot of information, the quality of the print has a direct effect on the readability of the bar code. Furthermore, the print quality is affected by various printer characteristics which may be specific to each individual printer. In particular, since PC meter printers are not dedicated to printing postage indicia, such printers are not expected to meet any USPS requirements, such as the minimum read rate set forth in the IBIP Indicium Specification. A number of other factors, such as environmental conditions, type of ink and printer wear, can affect print quality. Thus, the readability of the 2-D bar code will be affected by the various conditions outside the control of an IBIP vendor.

SUMMARY OF THE INVENTION

The present invention provides a method which allows customers to vary the 2-D bar code module size to increase the read rate for certain types of envelopes. For example, a user printing on a high paper quality envelope with an ink jet printer may choose a module size of 0.01"×0.03" which the user determines provides a readable bar code. If the user changes to an envelope type of less paper quality, the user may increase the bar code size by switching to a 0.015"×0.045" module size. This would have the advantage of making the bar code printed on the latter envelope more readable.

In accordance with the present invention a user is given control to increase and decrease a 2-D Bar code module size for an IBIP indicium. It has been found that this may allow the use of recycled paper (or other porous paper) envelopes with liquid ink jet printing. The user alters the module size (and thus the indicium size) which provides low resolution printing. Such user control is from the front panel for a mailing machine, or through the PC interface, such as the keyboard and display, for a PC meter. The present invention further includes the USPS providing feedback to the Vendor based upon print quality of verified indicia.

The control process could be automated by using a test print function and a scanner. The test print function prints a series of bar codes (or a test pattern) which is then scanned back into the system. The system could then determine the smallest module size feasible for the printer printing on a particular type of paper. In an alternate embodiment the test pattern is sent to the Vendor which performs the scanning and evaluation, and then recommends module size to the user.

In an alternate embodiment, a table of 2-D bar code module sizes corresponding to types of paper envelopes and printers is stored in the PC meter database whereby the user enters the type of paper envelope into the PC through the PC interface and the PC meter program, knowing the printer type, selects the appropriate 2-D bar code module size.

The present invention provides a method for improving print quality for a 2-D bar code. The method includes determining printer type, including print resolution, for printer that will print 2-D bar code and entering paper type for the envelope. A suggested 2-D bar code module size is calculated based on the paper and the printer type. A test sample 2-D bar code is printed at the suggested 2-D bar code module size. The printed test sample is scanned and then evaluated for print quality and readability. The method can also suggest a 2-D bar code module size to the user.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 3 is a flow chart of an alternate process for choosing bar code module size.

DETAILED DESCRIPTION OF THE PRESENT INVENTION

Figure 1:
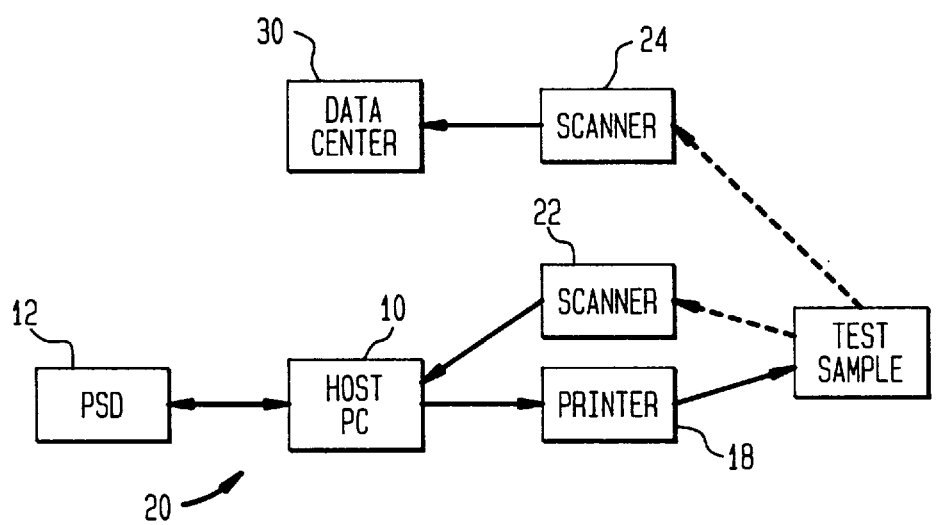
FIG. 1 is a block diagram of a postal system in which the present invention operates.

In describing the present invention, reference is made to the drawings, wherein there is seen in FIG. 1 a postal system in which the present invention operates. A host PC 10 is coupled to a PSD 12 and a printer 18. The host PC 10 is a conventional personal computer system, generally designated 20, including processor, hard drive, display and keyboard. The host PC 10 may be coupled to a scanner 22. The host PC 10 is connected, for example, by modem, network or other communication means, to a data center 30. Data Center 30 may be coupled to a scanner 24.

In accordance with the preferred embodiment of the present invention, a user prints on printer 18 a test print of a PDF417 2-D bar code having a predetermined module size. The test print is then inspected for errors. This can be done visually by the user, or with scanner 22. Scanner 22 may be a dedicated PDF417 scanner, or a standard PC scanner (either flatbed or hand-held). If it is a standard PC scanner, the bar code is interpreted in the host PC 10. Once the bar code has been scanned it is checked for errors and overall print quality. The host PC 10 will then make recommendations based upon the print quality. The user can either accept the print, or adjust the module size and repeat the process.

Figure 2:
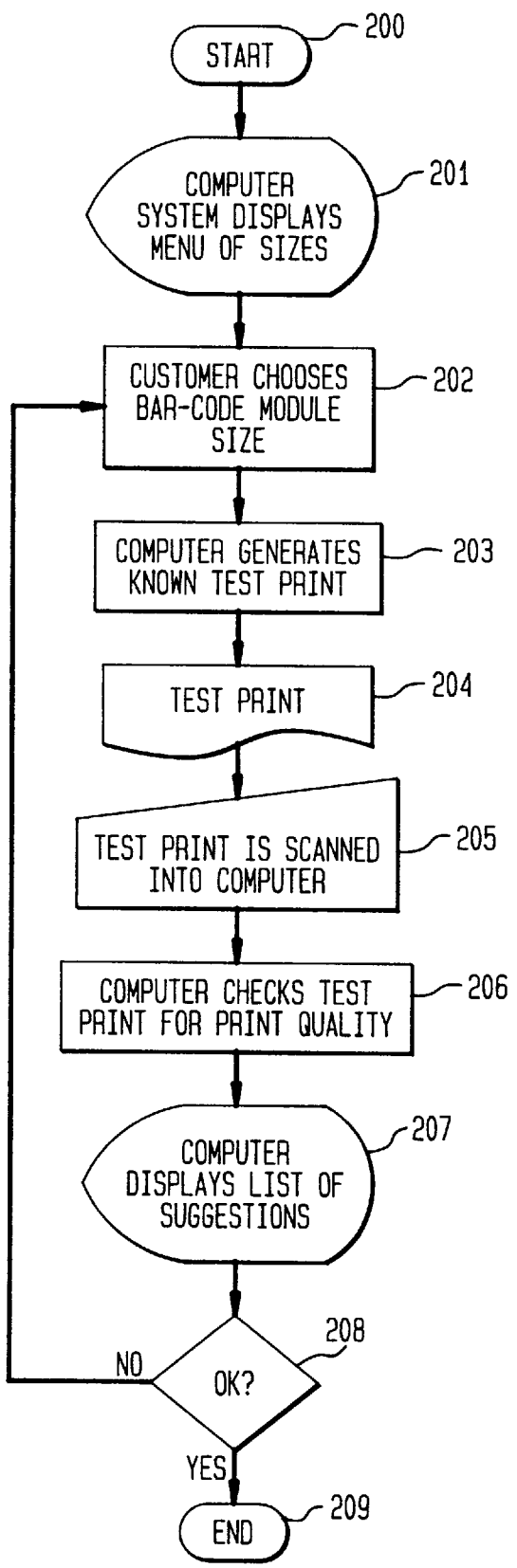
FIG. 2 is a flow chart of the process for choosing bar code module size in accordance with the present invention.

Referring now to FIG. 2, the process of the present invention begins at step 200. At step 201, a menu of bar code module sizes is displayed on the PC meter display. The sizes are based on known printer/paper combinations, previously stored values, or a set of numeric choices based on printer resolution. At step 202, the user chooses a bar code module size. The choice is made from the displayed menu, or may be made by entering a desired module size, for example, 0.01×0.03 inches. At step 203, the PC meter generates a predetermined test print message, in the form of 2-D bar codes, which is then printed, at step 204, on a sample envelope by the printer. At step 205, the user then causes the test print message on the envelope to be scanned into the PC which has print evaluation software stored therein. At step 206, the print quality of the scanned test print message is checked by the PC. Print quality is function of ink/envelope contrast, blurring of module edges, and other characteristics. One way of measuring print quality is the amount of error correction necessary to read a bar code. For example, a bar code, that requires the use of 20% of the error correction words to correctly read the bar code, is a higher quality print than one which requires 80% of the error correction words to correctly read the bar code.

At step 207, the PC displays a list of suggestions from the print evaluation software. The print evaluation software may accept the scanned test message, may recommend larger or smaller print size, or may recommend other solutions to improve print quality. For example, the print evaluation software may suggest new toner cartridge (for a laser printer), clearing an ink jet head or changing paper stock. At step 208, the user either accepts the test print message and, thus, the current setting for 2-D bar code module size, or selects another size and steps 202 through 208 are repeated. If the user accepts, the print routines are configured for printing indicia on the type of envelopes tested.

It is noted that steps 205 through 207 can be performed by the vendor hen the user sends the test print to the vendor. It is further noted that the forgoing process should be repeated periodically to maintain a high print quality.

Referring now to FIG. 3, an alternate embodiment is described. At step 305, printer information, i.e., printer name and resolution, is obtained from the PC operating system printer driver. At step 310, the user displays a list of known paper types on the PC. At step 315, the user enters the paper type into the PC. A software module in the PC, at step 220, calculates suggested module size based on the paper and printer information, and, at step 325, displays on the PC a list of module sizes and highlights the suggested one. At step 330, a test print message, preferably a 2-D bar code, is printed, and then scanned at step 335. At step 340, the scanned bar code is evaluated for overall print quality. If the print quality is not acceptable, the print evaluation software, at step 350, calculates new suggestions and steps 325 through 340 are repeated. If the print quality is acceptable, the resolution of the module size is set, at step 360, and the printer is ready to print indicia at step 365.

It will be understood that steps 335 through 350 can be performed by the vendor when the user sends the test print message to the vendor. It is further noted that the forgoing process should be repeated periodically to maintain a high print quality.

In accordance with the present invention, one user printing on a high paper quality envelope with a laser printer may receive a recommendation to use a module size of 0.01"× 0.03". Another user printing on a medium paper quality envelope with an ink jet printer (a marginal combination), may receive a recommendation to use a bar code module size of 0.015"×0.045" module size. The following are sample calculations demonstrating how the change is module size is determined.

In a first example, the printer coupled to the PC meter is a 600 dpi laser printer and the paper type for an envelope is high quality paper. The desired resolution for indicium modules for such quality paper is 0.01"×0.03". The calculation to determine module size is 0.01"×600 dpi=6 dots, and 0.03"×600 dpi=18 dots.

Thus, the indicium module size for a 600 dpi laser printer printing on high quality paper would be 6 pixels by 18 pixels.

In a second example, the printer coupled to the PC meter is a 300 dpi ink jet printer and the paper type for an envelope is medium quality paper. The desired resolution for indicium modules for such quality paper is 0.015"×0.045". The calculation to determine module size is 0.015"×300 dpi=4.5 dots →5/300=0.017", and 0.045"×300 dpi= 13.5 dots →14/300=0.047".

Thus, the indicium module size for a 300 dpi ink jet printer printing on medium quality paper would be 5 pixels by 14 pixels, which is 0.017"×0.047". It is noted that the module size is larger than the desired resolution because 4.5 dots and 13.5 dots are rounded to the next whole dot size.

In addition to PC meters, the present invention is suitable for use on a mailing machine with a scanner and evaluation software, and on a mailing machine that uses a PC to scan and evaluate the bar code.

While the present invention has been disclosed and described with reference to a single embodiment thereof, it will be apparent, as noted above, that variations and modifications may be made therein. It is, thus, intended in the following claims to cover each variation and modification that falls within the true spirit and scope of the present invention.

What is claimed is:

1. A method for improving print quality for a 2-D bar code, the method comprising the steps of determining printer type and print resolution for a printer that prints 2-D bar codes;

entering paper type;

calculating suggested 2-D bar code module size based on the paper type the printer type and the print resolution;

printing test sample 2-D bar code at the suggested 2-D bar code module size;

scanning the printed test sample; and evaluating the scanned test sample for print quality and readability.

2. The method of claim 1, comprising the further steps of:

recommending suggested 2-D bar code module size to user; and selecting suggested 2-D bar code module size.

3. The method of claim 1 wherein the scanning and evaluation is done at location remote from printing location.

4. The method of claim 1 wherein the evaluation is based on amount of error correction needed in reading the bar code.

5. A method for improving print quality for a 2-D bar code, the method comprising the steps of:

determining printer type and print resolution for a printer that prints 2-D bar codes; printing an indicium including a 2-D bar code on an envelope;

scanning for the purpose of reading and verifying an indicium printed thereon;

determining when print quality of the indicium on the mailpiece drops below a threshold value;

and notifying vendor or user when print quality drops below a threshold value;

recommending a 2-D bar code module size based on at least the print resolution.

6. The method of claim 5 wherein the step determining when print quality drops below a threshold value includes measuring the amount of error correction used to read the bar code.

7. The method of claim 1, comprising the further steps of:

recalculating the suggested 2-D bar code module size based on results from the evaluating step when the print quality of the scanned print test sample does not meet threshold requirements; and repeating the steps of printing, scanning and evaluating.

8. The method of claim 1, comprising the further step of:

setting resolution of the 2-D bar code module size when print quality of the suggested size is acceptable.

9. The method of claim 8, comprising the further step of:

printing indicia with 2-D bar code module size at the set resolution.

10. A method for improving print quality for a 2-D bar code, the method comprising the steps of determining printer type and print resolution for a printer that prints 2-D bar codes;

identifying paper type on which a 2-D bar code is to be printed;

calculating a suggested 2-D bar code module size based on the paper and the printer and the print resolution;

printing a test sample 2-D bar code at the suggested 2-D bar code module size;

scanning the printed test sample; and evaluating the scanned test sample for print quality and readability recalculating the suggested 2-D bar code module size based on results from the evaluating step when the print quality of the scanned print test sample does not meet threshold requirements; and repeating the steps of printing a test sample, scanning the printed test sample and evaluating the printed test sample.

11. The method of claim 10, comprising the further steps of setting resolution of the 2-D bar code module size when print quality of the suggested size is acceptable; and printing indicia with 2-D bar code module size at the set resolution.

12. The method of claim 11, comprising the further steps of:

recommending suggested 2-D bar code module size to user; and selecting suggested 2-D bar code module size.

13. The method of claim 1 whereby the 2-D bar code is part of a postal indicia.

* * * * *